3,294,822
3-UNSUBSTITUTED $\Delta^{4,9(10)}$-19-NORSTEROIDS AND PROCESS FOR THEIR MANUFACTURE
Albert Wettstein, Riehen, Georg Anner, Basel, and Hellmut Ueberwasser, Riehen, Switzerland, assignors to Ciba Corporation, New York, N.Y., a corporation of Delaware
No Drawing. Filed Feb. 17, 1964, Ser. No. 345,126
Claims priority, application Switzerland, Mar. 1, 1963, 2,676/63, 2,677/63; Jan. 9, 1964, 229/64
26 Claims. (Cl. 260—397.3)

The present invention provides the manufacture of the new 3-unsubstituted $\Delta^{4,9(10)}$-19-norsteroids, especially of that having the Formula I

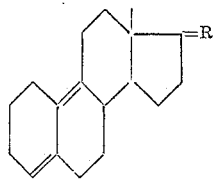

(I)

in which R stands for an oxo group or a free, esterified or etherified hydroxyl group in position $\beta$ and a hydrogen atom or a lower aliphatic hydrocarbon radical.

A lower aliphatic hydrocarbon radical stands preferably for an alkyl, alkenyl or alkinyl group containing 1 to 7 carbon atoms, above all for a methyl, ethyl, propyl, isopropyl, butyl, isobutyl, vinyl, allyl, methallyl, ethinyl or trifluoromethyl-ethinyl group. An esterfied or etherified hydroxyl group represents more especially the radical of the formula $R_1$—O— or $R_1$—COO— where $R_1$ stands for an aliphatic, cycloalphatic, araliphatic, aromatic or heterocyclic radical with up to 15 carbon atoms, being more especially one of the alkyl groups referred to above. Thus, esters of the new compounds are, for example, methylcarbonates, ethylcarbonates, formates, acetates, trifluoroacetates, propionates, butyrates, trimethylacetates, valerates, caproates, oenanthates, decanoates, undecylenates, hexahydrobenzoates, $\beta$-cyclopentylpropionates, $\beta$-phenylpropionates, benzoates or furoates; and also aliphatic or aromatic sulfonates, such at methane-, ethane- or para-toluenesulfonates.

The new compounds possess valuable pharmacological properties. More especially those of the androstane series which contain in position 17 in addition to an oxygen function a hydrogen atom or a saturated hydrocarbon residue exhibit for example, a strong anabolic effect. Androstanes that contain in position 17$\alpha$ an unsaturated hydrocarbon radical, possess more especially a progrestative and ovulation-inhibiting effect, and 17-oxoandrostane compounds have also an oestrogenic and anticholesterolaemic effect. The new compounds are therefore especially useful as anabolic, gestagenic and anticholesterolemic agents. They may also be used as intermediates in the manufacture of other valuable compounds.

Especially valuable compounds are $\Delta^{4,9(10)}$-17-oxo-19-norandrostadiene, $\Delta^{4,9(10)}$ - 17$\beta$ - hydroxy - 19 - norandrostadiene, $\Delta^{4,9(10)}$-17$\beta$-hydroxy-17$\alpha$-methyl-, -ethyl-, -n-propyl-, -vinyl-, -allyl- or -ethinyl-19-norandrostadiene and the esters, more especially the acetates, of the hydroxy compounds.

The new compounds are obtained when a 3-unsubstituted $\Delta^{5(10)}$-4-acyloxy-19-norsteroid is pyrolyzed and, if desired, in a resulting $\Delta^{4,9(10)}$-19-norsteroid, in as such known manner, possibly present esterified or etherified hydroxyl groups are liberated, hydroxyl groups are esterified, etherified or dehydrogenated to oxo groups, or any oxo groups present are reduced.

The pyrolytic scission of the starting products is advantageously performed at a temperature ranging from 100 to 250° C., in the presence or absence of a solvent, for example a high-boiling hydrocarbon such as xylene, tetraline or decaline, a catalyst and/or under an inert gas, under atmospheric or more especially reduced pressure, for example under a pressure of 0.1 to 15 mm. Hg.

When the final product is an ester it can be hydrolyzed, for example, by treatment with an aqueous or alcoholic base, for example a solution of an alkali metal carbonate, bicarbonate, hydroxide or alcoholate, such as lithium, sodium or potassium carbonate, bicarbonate, hydroxide, methylate or ethylate. Conversely, free hydroxyl groups can be esterified or etherified in known manner, for example with a reactive functional derivative of a carboxylic or sulfonic acid, such as its anhydride or halide, or with reactively esterified alcohols, such as an ester of a hydrohalic or sulfonic acid, or with dihydropyran.

Any hydroxyl groups present in the reaction product are dehydrogenated with advantage by oxidation with a compound of hexavalent chromium, such as chromium trioxide, or potassium bichromate, for example in pyridine or acetone+sulfuric acid, with manganese dioxide, with a derivative of a hypohalous acid, such as N-bromo-acetamide or succinimide, or by the Oppenauer method.

An oxo compound obtained as final product can be converted into the corresponding hydroxy compound, for example with a complex light-metal hydride such as sodium borohydride, lithium-aluminum hydride or lithium tritertiary butoxy-aluminum hydride. Simultaneously a lower aliphatic hydrocarbon radical can be introduced into the 17-position of androstane compounds, for example by reduction of a 17-oxo-androstadiene with an organo-metal compound of the type of the Grignard compounds, of methyl lithium or of lithium acetylide.

The starting materials used in the present process are new. Especially important starting materials are those of the Formula II

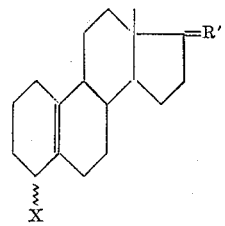

(II)

in which X stands for an acyloxy group in position $\alpha$ or $\beta$ and R' for an oxo group or an esterified or etherified hydroxyl group in position $\beta$ and a hydrogen atom or a lower aliphatic hydrocarbon radical. The acyloxy group X represents especially that of a lower aliphatic, cycloaliphatic, araliphatic or aromatic carboxylic acid, e.g., that of acetic, propionic, trimethylacetic, trifluoracetic, phenylacetic, hexahydro-benzoic or benzoic acid.

Specific starting materials are, for example, the 4-acetates or 4-benzoates of $\Delta^{5(10)}$-4-hydroxy-17-oxo-19-norandrostene, $\Delta^{5(10)}$-4-hydroxy-17-acetoxy-19-norandrostene, $\Delta^{5(10)}$-4-hydroxy-17$\alpha$-methyl-, -ethyl-, -n-propyl-, -vinyl-, -allyl- or -ethinyl-17$\beta$-acetoxy-19-norandrostene.

The starting materials indicated above are obtained when a 3-unsubstituted $\Delta^4$-19-hydroxysteroid is reacted with a heavy-metal acylate having an oxidative action, and, if desired, in a resulting $\Delta^{5(10)}$ - 4 - acyloxy - 19-norsteroid, in as such known manner, possibly present esterified or etherified hydroxyl groups are liberated, hydroxyl groups are esterified, or oxo groups reduced.

Heavy-metal acylates having an oxidative action are primarily acylates of tetravalent lead, more especially lead tetraacylates derived from lower aliphatic, cycloaliphatic, araliphatic or aromatic carboxylic acids, for example, those mentioned above; furthermore dialkyl lead diacylates, acylates of metaplumbic acid, silver or mercury acylates. Advantageously lead tetraacetate or -benzoate is used.

The reaction is performed, for example, in an inert solvent, for example carbon tetrachloride, advantageously a hydrocarbon such as hexane, heptane, methylcyclohexane, dimethylcyclohexane, benzene or more especially cyclohexane, generally at temperatures in excess of 40° C. more especially between 60 and 150° C., in the presence or absence of an acid-binding agent, for example alkaline earth metal carbonates, such as calcium carbonate, or tertiary organic bases, such as pyridine, catalysts and/or under an inert gas, under atmospheric or superatmospheric pressure.

The resulting $\Delta^{5(10)}$-4ξ-acyloxy-19-norsteroids can be hydrolyzed, for example by treatment with an aqueous or alcoholic base, advantageously the above mentioned bases. Conversely, free hydroxyl groups can be esterified in known manner, for example with reactive functional derivatives of the carboxylic or sulfonic acids mentioned at the beginning.

An oxo compound obtained can be converted as shown above into a corresponding hydroxy compound, for example with a complex light-metal hydride or an organo-metal compound of the type of the Grignard compounds, of methyl lithium or lithium acetylide.

The 3-unsubstituted $\Delta^4$-19-hydroxysteroids used as starting materials can be prepared, for example, from the corresponding $\Delta^4$-3-oxo-19-hydroxysteroids described in Indian Patent No. 72,940, preferably by conversion of the latter into a 3-thioketal, followed by desulfurization with Raney nickel or an alkali metal, for example with sodium in liquid ammonia. Any desired substituents, for example in position 17 are advantageously introduced in known manner after removal of the 3-oxo group. Another route of preparing the starting materials consists in the following process: a $\Delta^4$-steroid unsubstituted in positions 3 and 19 is converted into the 4β-hydroxy-5α-halogeno compound by adding on a hypohalous acid, for example hypochlorous or hypobromous acid; the resulting halogeno compound yields on reaction with a heavy-metal acylate having an oxidative action, such as lead tetraacetate, the corresponding 5α-halogeno-4β:19-ether. The ethers can be directly converted into the desired $\Delta^4$-19-hydroxysteroids by treatment with a reducing agent, such as zinc in glacial acetic acid, or sodium in liquid ammonia.

The invention includes also any variant of the present process in which an intermediate obtained at any stage of the process is used as starting material and any remaining process steps are carried out, or the process is discontinued at any stage, the optional process steps are performed in any desired order of succession, or the starting materials are formed under the reaction conditions.

The new, pharmacologically active compounds, more especially those of the Formula I, can be used as medicaments in human and veterinary medicine, for example in the form of pharmaceutical preparations which contain the new compounds in conjunction with an organic or inorganic, solid or liquid pharmaceutical excipient suitable for enteral (for example oral), parenteral or local administration. Suitable excipients are substances that do not react with the new compounds, for example water, gelatine, lactose, starches, magnesium stearate, talcum, vegetable oils, benzyl alcohols, gums, polyalkyleneglycols, white petroleum jelly, cholesterol or other known medicinal excipients. The pharmaceutical preparations may be in solid form, for example tablets, dragees or capsules, or in liquid or semi-liquid form as solutions, suspensions, emulsions, ointments or creams. These pharmaceutical preparations may be sterilized and/or may contain assistants such as preserving, stabilizing, wetting or emulsifying agents, salts for regulating the osmotic pressure, or buffers. They may also contain further therapeutically valuable substances. The preparations are formulated in known manner.

The following examples illustrate the invention. Melting points are uncorrected values.

*Example 1*

444 g. of lead tetrabenzoate are added to a mixture of 500 g. of precipitated calcium carbonate, 115 g. of $\Delta^4$-19-hydroxy-17-oxoandrostene and 12 liters of cyclohexane, and the whole is stirred and heated within one hour to 80° C. The reaction mixture is stirred for 2½ hours under reflux at a bath temperature of 90° C., the drops of water appearing at the beginning being removed by means of a water separator. The cooled solution is suctioned off, any undissolved reactants and the filter residue is rinsed with 1 liter of ether. On evaporation, the combined filtrates yield 281 g. of crude product which is dissolved in ether and filtered through a column of 1 kg. of alumina (activity II), rinsed with 2½ liters of ether and evaporated, to yield 197 g. of a purified fragmentation product. The progress of the reaction with lead tetrabenzoate can be checked by infrared spectra. The purified fragmentation product is characterized by 2 approximately equally strong bands at 5.75μ (5-ring ketone) and 5.85μ (benzoyloxy); it consists predominantly of $\Delta^{5(10)}$-4-benzoyloxy-17-oxo-19-norandrostene melting at 130–131° C. (from ether).

When 197 g. of the resulting product are subjected to a short pre-treatment under a water-jet vacuum and then distilled with stirring in a high vacuum of 0.05 to 0.15 mm. Hg at a bath temperature rising to 200° C., a forerunning of substantially crystalline benzoic acid is followed by the main product at 140–160° C. When this main fraction is washed in an ethereal solution with sodium bicarbonate solution until it is free from acid reaction products, and the ether is then distilled off, there is obtained an almost colorless oil which soon solidifies in crystalline form. When this product is diluted with methanol, the crystals are suctioned off and washed with methanol, there are obtained 39.5 g. of $\Delta^{4,9(10)}$-17-oxo-19-norandrostadiene in well-formed, colorless crystals which melt at 117° C. after recrystallization from methanol, ether or n-hexane. On redistillation of the mother liquor there are obtained a further 6 to 10 g. of this compound which displays in the ultraviolet spectrum a maximum at 258 mμ.

$\Delta^4$-19-hydroxy-17-oxoandrostene (melting at 156–157° C.) used as starting material can be prepared from $\Delta^4$-19-hydroxy-3:17-dioxoandrostene by selectively mercaptalizing it in position 3 in dioxane with addition of a catalytic amount of sulfuric acid and a mercaptan at a temperature below +20° C. (for example with methylmercaptan to form the $\Delta^4$-3:3-dimethylmercapto-17-oxo-19-hydroxyandrostene melting at 141–142° C., or with ethylenedithiol to form the $\Delta^4$-3:3-ethylenedimercapto-17-oxo-19-hydroxyandrostene melting at 169–170° C. The desulfurization of these mercaptals to the corresponding 3-desoxo compounds can be performed in known manner, for example with the aid of Raney nickel in methanol, or of sodium in liquid ammonia.

*Example 2*

A suspension of 19 g. of $\Delta^4$-19-hydroxy-17-oxoandrostene, 40 g. of finely powdered calcium carbonate, 38.4 g. of lead tetraacetate dried under a high vacuum, and 1.95 liters of cyclohexane is heated with stirring in the course of 30 minutes to 60° C., then within another 30 minutes raised to the boil and then boiled for 30 minutes under reflux and interpolation of a water separator. The reaction mixture is cooled and filtered and the filter residue is washed with ether. When the filtrate is evaporated under vacuum, it yields 22 g. of crude product. When this is distilled, analogous to the method described in Example 1, there is likewise obtained the $\Delta^{4,9(10)}$-17-oxo-19-norandrostadiene though in a poorer yield.

A sample of the above crude product can be purified by chromatography on silica gel (solvent: cyclohexane+ethyl acetate 4:1). The initial fractions yield after some by-products in the forerunnings pure $\Delta^{5(10)}$-4ξ-acetoxy-17-oxo-19-norandrostene from which the predominant epimer crystallizes on addition of ether. After having been recrystallized from methanol it melts at 121–122° C.

2.9 g. of crude $\Delta^{5(10)}$-4ξ-acetoxy-17-oxo-19-norandrostene are dissolved in 60 cc. of methanol, 6 g. of potassium carbonate are added and the whole is stirred under nitrogen with initial cooling to +13° C. to 25° C. for 14 hours. By diluting the reaction mixture with benzene, partial evaporation under vacuum, addition of water, separation of the aqueous layer and extracting it with benzene, washing the organic solutions with water, drying and evaporating them under vacuum, there are obtained 2.3 g. of crude mixture of the epimers of the $\Delta^{5(10)}$-4ξ-hydroxy-17-oxo-19-norandrostenes, from which on addition of 4 cc. of ether 1.2 g. of epimer which preponderates by weight crystallise out; after recrystallization from ether the product melts at 163–165° C. The mixture of epimers can be further separated by chromatography on silica gel; the smaller amount of the epimer melting at 179–182° C., travels in cyclohexane+ethyl acetate 4:1 faster and is obtained first. It is followed by the epimer, melting at 163–165° C., described above.

*Example 3*

A solution of 4 g. of sodium borohydride in 80 cc. of methanol is tipped at 20–28° C. into a mixture of 5 g. of $\Delta^{4,9(10)}$-17-oxo-19-norandrostadiene in 60 cc. of methanol and 1 cc. of pyridine under a nitrogen atmosphere; the whole forms a homogeneous solution within 5 minutes at room temperature. The reaction solution is heated in a bath maintained at 50° C. and allowed to boil under reflux for 30 minutes, then allowed to cool to 40° C. A solution of 1.6 g. of potassium hydroxide in 10 cc. of water is added and the mixture is again heated for 10 minutes at the boil. The reaction mixture is allowed to cool, diluted with 400 cc. of benzene, the separating aqueous layer is further extracted with benzene and the organic solutions are successively washed with 3 x 100 cc. of water. The organic solutions are repeatedly dried with potassium carbonate and then evaporated under vacuum (initially under 11 mm. Hg and finally under 0.1 mm. Hg), to yield 5.0 g. of spectroscopically pure $\Delta^{4,9(10)}$-17β-hydroxy-19-norandrostadiene as a colorless resin which, in a solution in rectified alcohol, displays in the ultraviolet spectrum an absorption maximum at 256 mμ.

A solution of 2.4 g. of crude $\Delta^{4,9(10)}$-17β-hydroxy-19-norondrostadiene in 10 cc. of pyridine is mixed with 5 cc. of acetic anhydride and left to itself for 14 hours at room temperature. The reaction mixture is then separated by adding 50 g. of ice. The batch is stirred for ½ hour, ether is added, the ethereal solution is separated and repeatedly washed with ice-cold dilute hydrochloric acid, then with sodium bicarbonate solution, and the organic phase is dried with sodium sulfate and evaporated under vacuum, to yield 2.68 g. of crude $\Delta^{4,9(10)}$-17β-acetoxy-19-norandrostadiene which on chromatography on 135 g. of silica gel and elution with cyclohexane+ethyl acetate (4:1) yields 2.2 g. of crystalline product which on recrystallization from alcohol of 95% strength is obtained in colorless crystals, free from alcohol of crystallization, melting at 73–75° C.

*Example 4*

A solution of 5 g. of $\Delta^{4,9(10)}$-17-oxo-19-norandrostadiene in 60 cc. of ether is introduced under nitrogen at a temperature rising from 20° C. to about 30° C. in a thin jet, while stirring, into a solution of methyl lithium prepared from 2.2 g. of granulated lithium metal, 65 cc. of ether and 30 g. of methyl iodide, freed from excess lithium, and the batch is then rinsed with 20 cc. of ether and stirred for 4 hours at 25° C. 30 cc. of saturated aqueous sodium sulfate solution are then cautiously added at 10 to 20° C. to the reaction mixture, a small amount of benzene is added, the aqueous layer separated, and the organic solution is repeatedly washed with water, dried with sodium sulfate and evaporated, to yield 5.6 g. of crude product which, after two recrystallizations from ether, furnishes 3.4 g. of pure $\Delta^{4,9(10)}$-17α-methyl-17β-hydroxy-19-norandrostadiene melting at 115–116° C. On chromatography on silica gel, the mother liquor yields some more of the methylation product, accompanied by starting material.

*Example 5*

A solution of 9.4 g. $\Delta^{4,9(10)}$-17-oxo-19-norandrostadiene in 65 cc. of toluene and 600 cc. of ether is saturated at −5° C. with acetylene gas dried over Blaugel (silica gel with moisture indicator). In the course of 10 minutes, at −5° to −2° C., 150 cc. of a 1.9 N-solution of sodium tertiary amylate in tertiary amyl alcohol and toluene are then stirred in portionwise. In the course of another 14 hours, at +2 to +3° C. a weak current of acetylene gas is introduced with stirring. The reaction mixture is then stirred into a mixture of 300 cc. of ammonium chloride solution of 25% strength and 100 g. of ice, the organic phase is washed once with dilute ammonium chloride solution and twice with water, dried with sodium sulfate and evaporated under a water-jet vacuum, finally under a high vacuum of 0.1 mm. Hg. Yield: 10.6 g. of crude $\Delta^{4,9(10)}$-17α-ethinyl-17β-hydroxy-19-norandrostadiene which crystallises on addition of 20 cc. of n-hexane and melts at 110–112° C. On recrystallization from methanol and from ether+n-hexane the product melts at 120–123° C.

*Example 6*

A solution of 3.0 g. of $\Delta^{5(10)}$-4ξ-acetoxy-17-oxo-19-norandrostene in 40 cc. of toluene and 200 cc. of ether is saturated at −5° to −10° C. with dry acetylene, and while continuing the injection of acetylene and stirring the batch, 100 cc. of a 1.9 N-solution of sodium tertiary amylate in a mixture of toluene and tertiary amyl alcohol are added in the course of 10 minutes. The batch is stirred for another 14 hours at 0° to +3° C. while slowly introducing acetylene. The reaction mixture is then poured over 150 g. of ice and 150 cc. of ammonium chloride solution of 25% strength, the organic phase is separated and agitated with ether; the organic solutions are successively washed with ice-cold dilute ammonium chloride solution and twice with ice water, dried and evaporated under vacuum (finally under 0.1 mm. Hg), to yield 3.3 g. of crude ethinylation product. The crystalline product is sparingly soluble in ether; when it is mixed with 15 cc. of ether and washed, there are obtained 1.5 g. of $\Delta^{5(10)}$-4ξ:17β-dihydroxy-17α-ethinyl-19-norandrostene which melts at 193° C. after having been recrystallized from acetone+benzene. The ethereal filtrate of this compound consists predominantly of $\Delta^{5(10)}$-4ξ-acetoxy-17β-hydroxy-17α-ethinyl-19-norandrostene which is obtained by chromatography in cyclohexane+ethyl acetate 4:1 on silica gel from the initial fractions in crystals melting at 74–76° C.

The mixture of 800 mg. of $\Delta^{5(10)}$-4ξ:17β-dihydroxy-17α-ethinyl-19-norandrostene, 14 cc. of pyridine and 10 cc. of acetic anhydride is refluxed for 14 hours in a bath maintained at 160° C. under nitrogen. The batch is then cooled to 70° C. and evaporated under a water-jet vacuum in a bath maintained at 70° C. The dark-colored residue is twice taken up in benzene and the solution is again evaporated under vacuum. The crude reaction product is then stirred with 60 cc. of ether and the undissolved sludge is filtered off. The ethereal filtrate is washed twice with ice-cold N-hydrochloric acid, once with ice-cold sodium bicarbonate solution of 5% strength, dried with sodium sulfate and evaporated under vacuum, to yield 870 mg. of crystalline $\Delta^{5(10)}$-4ξ:17β-diacetoxy-17α-ethinyl-19-norandrostene which melts at 189–191° C. after recrystallization from ether.

On distillation of the $\Delta^{5(10)}$-4ξ-acetoxy-17β-hydroxy-17α-ethinyl-19-norandrostene or its acetate according to the method described in Example 1 there is obtained the $\Delta^{4,9(10)}$-17α-ethinyl-17β-hydroxy-19-norandrostadiene or its 17-O-acetate respectively.

What is claimed is:

1. Process for the manufacture of 3-unsubstituted $\Delta^{4,9(10)}$-19-norsteroids, wherein a 3-unsubstituted $\Delta^{5(10)}$-4-acyloxy-19-norsteroid is pyrolyzed.

2. Process according to claim 1, wherein pyrolysis is carried out at a temperature between 100 and 250° C.

3. Process according to claim 1, wherein pyrolysis is carried out in the presence or absence of a solvent.

4. Process according to claim 3, wherein a high-boiling hydrocarbon is used.

5. Process according to claim 1, wherein pyrolysis is carried out under reduced pressure.

6. Process according to claim 1, wherein compounds of the formula

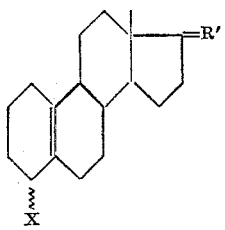

are used as starting material, in which X stands for an acyloxy group and R' for a member selected from the group consisting of oxo, esterified β-hydroxy and hydrogen, etherified β-hydroxy and hydrogen, esterified β-hydroxy and a lower aliphatic hydrocarbon radical, and etherified β-hydroxy and a lower aliphatic hydrocarbon radical each of said etherified β-hydroxy substituents being derived from a member selected from the group consisting of an alkanol having 1–15 carbon atoms and dihydropyran.

7. Compounds of the formula

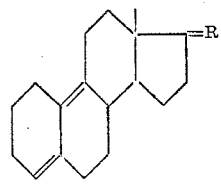

in which R represents a member selected from the group consisting of oxo, β-hydroxy and hydrogen, esterified β-hydroxy and hydrogen, etherified β-hydroxy and hydrogen, β-hydroxy and a lower aliphatic hydrocarbon radical, esterified β-hydroxy and a lower aliphatic hydrocarbon radical, and etherified β-hydroxy and a lower aliphatic hydrocarbon radical each of said etherified β-hydroxy substituents being derived from a member selected from the group consisting of an alkanol having 1–15 carbon atoms and dihydropyran.

8. $\Delta^{4,9(10)}$-17-oxo-19-norandrostadiene.

9. A member selected from the group consisting of $\Delta^{4,9(10)}$-17β-hydroxy-19-norandrostadiene and its esters of a member selected from the group consisting of carboxylic acids and sulfonic acids with up to 16 carbon atoms.

10. A member selected from the group consisting of $\Delta^{4,9(10)}$-17β-hydroxy-17α-methyl-19-norandrostadienne and its esters of a member selected from the group consisting of carboxylic acids and sulfonic acids with up to 16 carbon atoms.

11. A member selected from the group consisting of $\Delta^{4,9(10)}$-17β-hydroxy-17α-ethyl-19-norandrostadiene and its esters of a member selected from the group consisting of carboxylic acids and sulfonic acids with up to 16 carbon atoms.

12. A member selected from the group consisting of $\Delta^{4,9(10)}$-17β-hydroxy-17α-allyl-19-norandrostadiene and its esters of a member selected from the group consisting of carboxylic acids and sulfonic acids with up to 16 carbon atoms.

13. A member selected from the group consisting of $\Delta^{4,9(10)}$-17β-hydroxy-17α-ethinyl-19-norandrostadiene and its esters of a member selected from the group consisting of carboxylic acids and sulfonic acids with up to 16 carbon atoms.

14. $\Delta^{4,9(10)}$-17β-acetoxy-19-norandrostadiene.

15. $\Delta^{4,9(10)}$-17β-acetoxy-17α-ethinyl-19-norandrostadiene.

16. Compounds of the formula

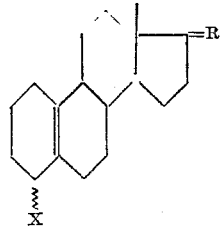

in which X stands for a member selected from the group consisting of hydroxy and esterified hydroxy and R for a member selected from the group consisting of oxo, β-hydroxy and hydrogen, esterified β-hydroxy and hydrogen, etherified β-hydroxy and hydrogen, β-hydroxy and a lower aliphatic hydrocarbon radical, esterified β-hydroxy and a lower aliphatic hydrocarbon radical, and etherified β-hydroxy and a lower aliphatic hydrocarbon radical each of said etherified β-hydroxy substituents being derived from a member selected from the group consisting of an alkanol having 1–15 carbon atoms and dihydropyran.

17. A member selected from the group consisting of $\Delta^{5(10)}$-4ξ-hydroxy-17-oxo-19-norandrostene and its esters of carboxylic acids having up to 16 carbon atoms.

18. A member selected from the group consisting of $\Delta^{5(10)}$-4ξ,17β-dihydroxy-19-norandrostene and its esters of carboxylic acids having up to 16 carbon atoms.

19. A member selected from the group consisting of $\Delta^{5(10)}$-4ξ,17β-dihydroxy-17α-methyl-19-norandrostene and its esters of carboxylic acids having up to 16 carbon atoms.

20. A member selected from the group consisting of $\Delta^{5(10)}$-4ξ,17β-dihydroxy-17α-ethyl-19-norandrostene and its esters of carboxylic acids having up to 16 carbon atoms.

21. A member selected from the group consisting of $\Delta^{5(10)}$-4ξ,17β-dihydroxy-17α-allyl-19-norandrostene and its esters of carboxylic acids having up to 16 carbon atoms.

22. A member selected from the group consisting of $\Delta^{5(10)}$-4ξ,17β-dihydroxy-17α-ethinyl-19-norandrostene and its esters of carboxylic acids having up to 16 carbon atoms.

23. $\Delta^{5(10)}$-4ξ-acetoxy-17-oxo-19-norandrostene.

24. $\Delta^{5(10)}$-4ξ-benzoyloxy-17-oxo-19-norandrostene.

25. $\Delta^{5(10)}$-4ξ-acetoxy-17β-hydroxy-17α-ethinyl-19-norandrostene.

26. $\Delta^{5(10)}$-4ξ,17β-diacetoxy-17α-ethinyl-19-norandrostene.

No references cited.

LEWIS GOTTS, *Primary Examiner.*

T. M. MESHBESHER, *Assistant Examiner.*

UNITED STATES PATENT OFFICE
CERTIFICATE OF CORRECTION

Patent No. 3,294,822                          December 27, 1966

Albert Wettstein et al.

It is hereby certified that error appears in the above numbered patent requiring correction and that the said Letters Patent should read as corrected below.

Column 7, line 66, for "norandrostadienne" read -- norandrostadiene --; column 8, lines 20 to 29, the upper right-hand portion of the formula should appear as shown below instead of as in the patent:

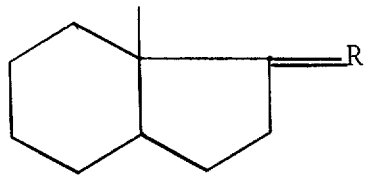

Signed and sealed this 7th day of November 1967.

(SEAL)
Attest:

EDWARD M. FLETCHER, JR.                   EDWARD J. BRENNER
Attesting Officer                             Commissioner of Patents